APPARATUS FOR REGULATING OUTPUT OF PHOTOSENSITIVE SCANNERS

Filed April 20, 1956

INVENTORS
David H. Shepard and
Howard W. Silsby III
BY Mason, Fenwick & Lawrence
ATTORNEYS

APPARATUS FOR REGULATING OUTPUT OF PHOTOSENSITIVE SCANNERS

INVENTORS
David H. Shepard and
Howard W. Silsby III
BY
Mason, Fenwick & Lawrence
ATTORNEYS

APPARATUS FOR REGULATING OUTPUT OF PHOTOSENSITIVE SCANNERS

Filed April 20, 1956

INVENTORS
David H. Shepard and
Howard W. Silsby III
BY
Mason, Fenwick & Lawrence
ATTORNEYS United States Patent Office 2,943,208

Patented June 28, 1960

2,943,208

APPARATUS FOR REGULATING OUTPUT OF PHOTOSENSITIVE SCANNERS

David H. Shepard, Falls Church, and Howard W. Silsby III, Arlington, Va., assignors to Intelligent Machines Research Corporation, Arlington, Va., a corporation of Maryland Filed Apr. 20, 1956, Ser. No. 579,594

25 Claims. (Cl. 250—219)

The present invention relates in general to automatic sensitivity control systems for light-responsive electronic scanning equipment, and more particularly to apparatus for use in devices for automatically sensing perceptible images, characters or presentations, such as automatic character sensing equipment, line reproducing facsimile systems, photo-facsimile and television devices and the like, which apparatus is controlled by the background light-intensity level and a standard reference light-intensity level to regulate the sensitivity of photoelectric transducers associated with the apparatus and stabilize the output against variations.

The present invention is particularly applicable to the field of automatic character sensing, and the ensuing description will be particularly applied to that field. Automatic character sensing equipment as employed in this field may briefly be described as apparatus which scan intelligence-bearing documents or the like containing items of information such as printed characters, sense the presence and/or absence of bits of each character thereon in reference to a time and/or positional base and relation and produce signals indicative of the presence and absence of such bits of characters within the scanning field, interpret the signals thus produced to identify the character sensed, and produce an output at some desired time indicative of the character read. Examples of such apparatus are disclosed in U.S. Patent No. 2,663,758, granted December 22, 1953, to David H. Shepard and the copending patent application of David H. Shepard Serial No. 399,227, filed December 17, 1953, entitled Apparatus for Reading, now Patent No. 2,897,481. These character sensing systems perform their functions by use of digital scanning signals, therefore requiring pulses of uniform amplitude and the variables permitted are position of pulses within a scan and duration of pulses.

Frequently, the photoelectric transducer of the sensing components of such character sensing apparatus employ electron multiplier photocells which provide high gain in this stage. Any photoelectric device is essentially an analog rather than a digital device, that is, its voltage output is normally a function of light intensity and its photosensitivity. Thus, factors which affect the light intensity and factors which affect photosensitivity will affect the output voltage. The electron multiplier type photocell employs a large number of dynodes, usually 9. Light falling upon the photocathode of the photomultiplier causes electrons to be emitted, which electrons are attracted to an adjacent dynode which is at a higher potential, a secondary emission effect over this dynode causes a much larger emission of electrons than is received from the photocathode, resulting in a multiplication of the electron stream. The successive dynodes are at successively higher potentials, so that the stream of electrons from each dynode is attracted to the adjacent dynode of higher potential, repeating a multiplication of the electron stream at each of the successive dynodes. Thus, the current which reaches the plate of the photomultiplier is equal to the photocathode emission current multiplied by the average current gain per dynode, raised, in the case of 9 dynodes, to the 9th power. For this reason, small changes in the current gain per dynode have a very large effect on the light sensitivity.

The current gain per dynode is affected by a number of factors such as temperature, voltage per dynode, small changes in the physical dynode structure, and the like. The light sensitivity of many commercial photomultipliers of a specific type may vary greatly from one tube to another. The light sensitivity of photomultipliers also changes during operation due to temperature and voltage changes and due to an additional phenomenon known as photocathode "fatigue." In addition to the factors which affect the sensitivity of the photomultiplier, variations in voltage of the document-illuminating lamp, changes of lamp illumination output due to aging, and variations in the background reflectivity of the character-bearing document all cause variations in the intensity of the light which reaches the photomultiplier so that in the absence of means to compensate for all of the above variables, the output is intolerably variable.

The requirement that scanner signals produced in the scanner sensing stages of automatic character sensing devices be digital requires that effects of all of the above-mentioned variables be compensated. Because some of the variables exhibit short time changes, manual adjustment of compensating devices would require constant attention of a monitoring operator.

Not only is an automatic sensitivity regulating scheme which compensates for these variables an absolute necessity in a practical automatic character sensing system, but it is also of great benefit in facsimile systems reproducing line drawings, printing, and the like, in photo-facsimile and television, and in other apparatus employing photoelectric sensing of perceptible images or presentations wherein high fidelity reproduction is an important consideration.

In connection with automatic character sensing schemes, another factor is the wide variation in darkness of characters that may occur and the problem of distinguishing between signal and noise which may arise when light or indistinct characters are being read. In order to achieve the exceedingly high fidelity which is required of automatic character sensing apparatus, there should be incorporated in the apparatus a facility which is responsive to the darkness of characters recently seen or to a standard darkness reference, whichever is of greater darkness, to provide a darkness standard or threshold for qualifying scanner signals to achieve optimum discrimination between signal and noise over wide variations in character blackness. This feature likewise has beneficial application to image-sensing and reproducing systems generally.

An object of the present invention, therefore, is the provision of novel apparatus for stabilizing the output of photosensitive devices against variations in field light intensity level sensed by the photosensitive device and against changes in the sensitivity of the photosensitive device.

Another object of the present invention is the provision of novel apparatus for regulating the output of photoelectric scanning devices to compensate for variations in document-illumination intensity, changes in reflectivity of document background, and changes in sensitivity of the scanning device.

Another object of the present invention is the provision of novel apparatus for controlling the sensitivity of a photosensitive scanning system as a function of background light intensity level of documents or presentation-bearing surfaces being sensed by the system.

Another object of the present invention is the provision of novel apparatus for regulating the output of photoelectric document scanning devices by detecting the background reflectivity of a document being scanned and referencing the same to a standard light intensity level to compensate for variations in field illumination intensity, document background reflectivity, and scanning device sensitivity so as to produce output signals which appear to have been the result of scanning documents of uniform background reflectivity when documents of widely varying background reflectivity are scanned.

Another object of the present invention is the provision of novel apparatus for stabilizing the output of photosensitive scanning devices by periodically referencing the background light intensity level detected from the scanning field to a signal produced when the scanning device sees no light, detecting the difference between the reference signal and the background signal, comparing the difference detected with a standard difference, and adjusting the sensitivity of the scanning system to bring the detected difference into correspondence with the standard difference.

Another object of the present invention is the provision of novel apparatus for controlling the sensitivity of a photosensitive scanning device in automatic character sensing apparatus to compensate for variations in character reflectivity of intelligence-bearing characters being scanned.

Another object of the present invention is the provision of novel apparatus for controlling the sensitivity of a photosensitive scanning device in automatic character sensing apparatus to compensate for variations in character reflectivity of intelligence-bearing characters being scanned by establishing a threshold for discrimination of output signals, which threshold is elevated above a standard level as a function of the darkest character recently detected by the scanning device, which exceeds the standard level.

Another object of the present invention is the provision of means for use with automatic character sensing apparatus for achieving a high degree of discrimination between character detection signals and noise over wide variations in character blackness.

Other objects, advantages and capabilities of the present invention will become apparent from the following detail description, taken in conjunction with the accompanying drawings, showing two preferred embodiments of the invention.

The present invention is directed, in general, to circuitry for referencing the voltage level of the output signal of a photoelectric scanning device which is produced as a function of the detected light intensity reflected from a scanned document, to the voltage level of the scanning device output signal when no light is detected by the scanning device, such as the output signal on scanning of absolute darkness, and comparing the difference between these voltage levels with a standard difference to produce a control voltage bearing a relation to the departure of the difference detected from the standard difference. This control voltage is fed back to the photoelectric device to vary its gain and thereby stabilize the scanning device output signal against variations in reflectivity of the scanning field, in illumination of the scanning field, and in the sensitivity of the scanning device. Additional means are provided for sensing, in terms of scanning device output voltage, the immediately prior history of output signals produced upon detection of areas within the scanning field of low light reflectivity opaque characters, patterns or lines, or the like, and establishing an amplitude to which a character detection output signal must rise in order to produce an ultimate output signal and insure optimum discrimination between signal and noise over wide variations in character blackness. To facilitate an adequate understanding of the present invention, it will be described in conjunction with a scanning device adapted particularly for scanning character-bearing documents to produce output signals to be fed to interpreting apparatus in an automatic character sensing system.

Figures 1, 2:
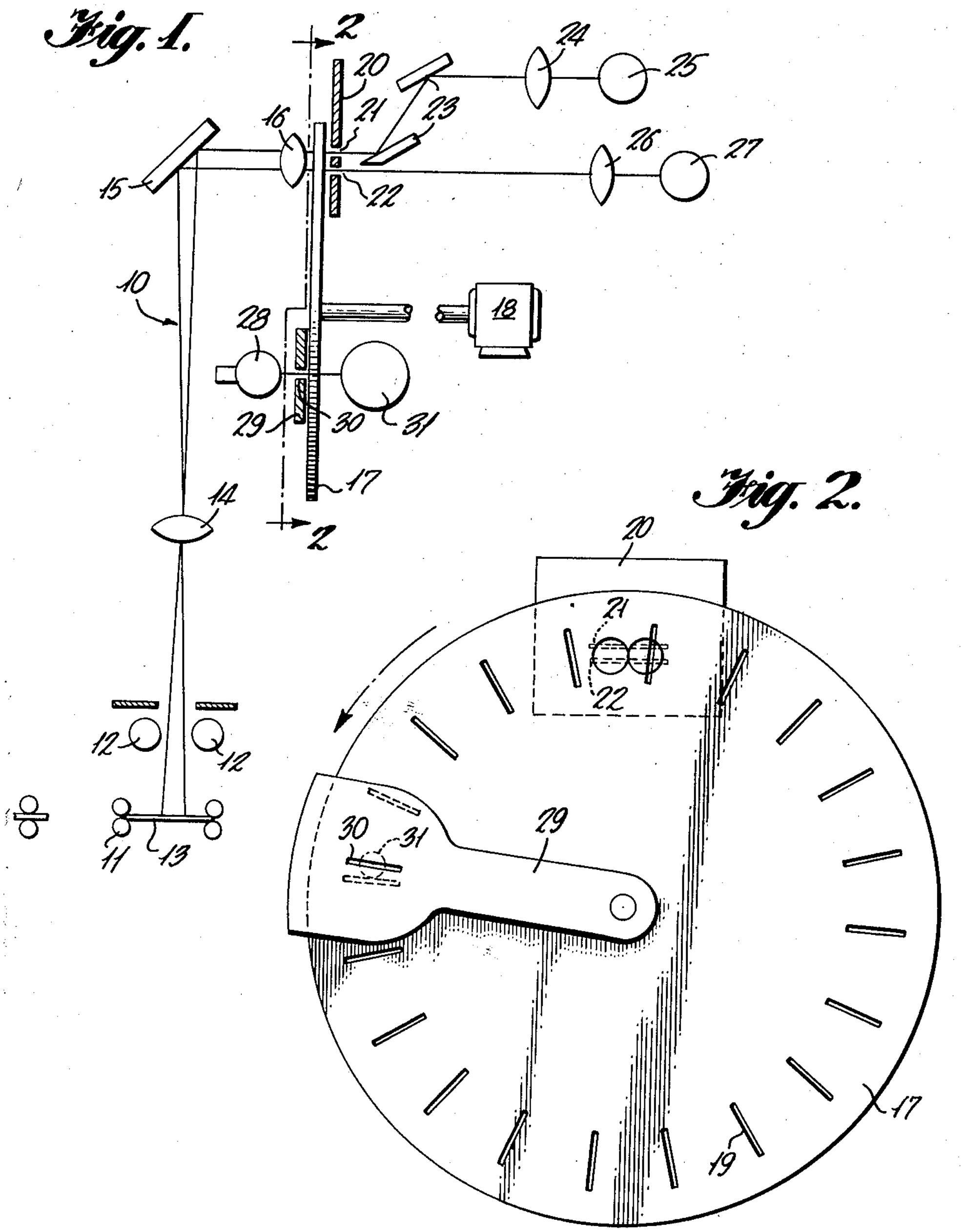
Figure 1 is an optical schematic diagram of the optical scanning components of one form of scanning apparatus with which the present invention may be used.
Figure 2 is an elevational view of the scanning disk in the scanning unit illustrated in Figure 1, viewed from the line 2—2 of Figure 1.

Such a scanning device is illustrated in Figures 1 and 2 and comprises a scanning assembly, generally indicated by the reference character 10, mounted directly over feed track 11 of suitable automatic document feed mechanism so that the optical center line of the scanning unit 10 is perpendicular to the plane of the feed track with the optical center line lying in the center of the scan zone from which information is to be read. The reading area is brightly illuminated by a pair of prefocused lamps 12, which may be type 1383 lamps.

Light reflected from the document, indicated generally at 13, is focused by a lens 14, and is bent through an angle of 90 degrees by a first surface mirror 15, and thence through a correcting lens 16 to focus the image of the document on the plane of the scanning disk 17. The scanning disk is driven at high speed by a motor 18, and as will be apparent from Figure 2, comprises a number of radial slits 19 disposed near the periphery of the disk 17. In a preferred embodiment, the scanning disk is a 7.5 inch diameter aluminum disk containing 20 0.010 inch wide radial slits 19 spaced at equal intervals. The scanning disk 17 in this preferred embodiment is rotated at a rate of 7200 revolutions per minute, thereby providing 2400 scans per second as a scan repetition rate. The portion of the image which passes through the radial slits 19 in the scanning disk 17 falls upon a fixed slit plate 20 having horizontal slits 21, 22 therein which are slightly shorter in length than the spacing between successive radial slits 19 of the scanning disk 17. The beam transmitted by the uppermost fixed horizontal slit 21 is bent laterally into a parallel path with the transmitted beam by a pair of mirrors 23 and is transmitted through an optical lens 24 to the photocathode of a photomultiplier tube 25. The beam transmitted by the lowermost fixed horizontal slit 22 is directed by an optical lens 26 onto the photocathode of a photomultiplier tube 27. The purpose of the lenses 24 and 26 is to defocus the image so that variations in sensitivity from point to point on the photocathode surface will not cause excessive noise.

In the operation of the scanning unit 10, light from the illuminating lamps 12 is reflected from the surface of the document 13 as the document passes the reading stage. As the image of the document at the reading stage is focused on the plane of the scanning disk 17 in the path of the scanning disk radial slits 19, passage of a radial slit 19 under the image allows a thin slice of the image to fall upon the fixed slit plate 20. This thin slice travels across the image, allowing a changing portion of the image to fall upon the slit plate 20 as the disk 17 rotates. The portions of the radial image which interesct the two horizontal slits 21, 22 are directed on the photocathodes of the photomultipliers 25 and 27.

The effect of this scanning operation is to provide simultaneous scanning of two lines across the image. The direction of scanning is normal to the direction of image motion due to movement of the document 13 by the document feed mechanism 11. Thus, the scanning unit causes vertical scanning along a pair of fixed lines while the motion of the document causes the scans to progress horizontally with respect to the document.

The length of the horizontal slits 21, 22 is slightly less than the distance between successive slits 19 so that there is an interval after the completion of one scan and before the beginning of the next scan when no light passes through the scanning disk 17. This interval is called the "dark time" and the pulse which it causes, in a manner to be later described, is called the "black pulse." This pulse is used as a reference by the sensitivity control circuits, and, in the claims, it is referred to as the reference pulse.

Provision is also made in the scanning unit 10 for providing timing signals, designated $T_f$, which identify the end of each scanning frame. For this purpose, an exciter lamp 28 is mounted in front of the scanning disk 17 on an adjustable radial bracket 29 which is journalled about the shaft of the scanning disk 17. The $T_f$ mounting bracket 29 is provided with a radial slit 30 which is in registry with the path of the radial slits 19 of the scanning disk 17 to allow a narrow radial beam of light emitted from the exciter lamp 28 to pass through the $T_f$ slit 30 onto the scanning disk 17. A photocell 31 for generating the timing signal $T_f$ is mounted on or behind the $T_f$ mounting bracket 29 in alignment with the exciter lamp 28 and the radial slit 30. Thus, each time one of the scanning disk slits 19 passes under the radial beam of light transmitted through the $T_f$ radial slit 30, the beam strikes the photosensitive end of the photocell 31. The timing signal photocell 31 is a conventional simple photoelectric cell of the two-element type having a plate and a photocathode.

It should be understood that the invention hereinafter described in detail is not, by any means, limited to the particular scanning unit described above but may be used with a large variety of scanning mechanisms designed to sense the area of a scanning field with one or a plurality of photosensitive devices to detect and produce output signals indicative of the presence or absence of dark areas within the scanning field.

Figure 3A:
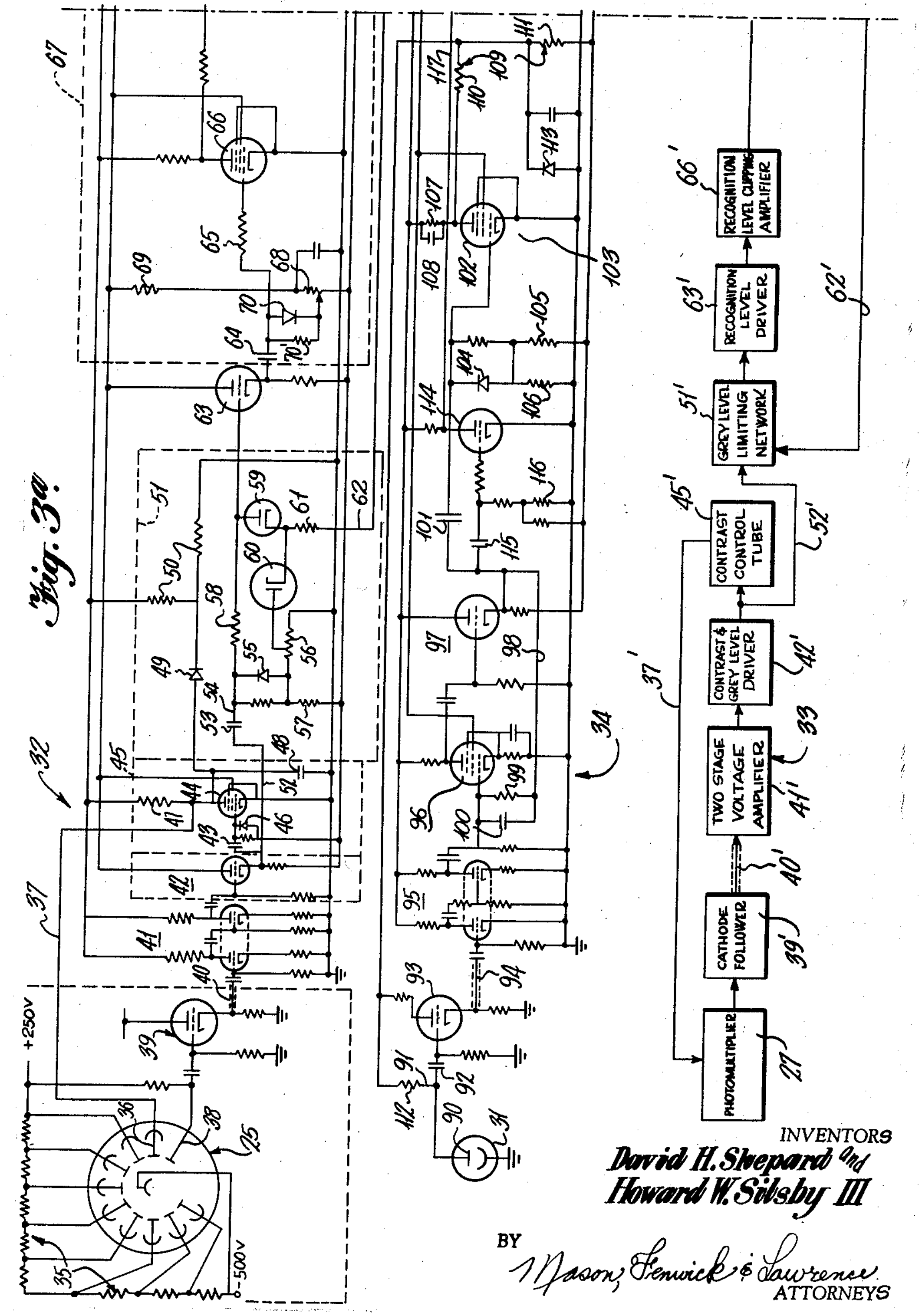
Figures 3A and 3B, when placed in order, side-by-side, show a schematic circuit diagram of an embodiment of the present invention, with repeated or duplicated parts shown in block diagram form.
Figure 3B:
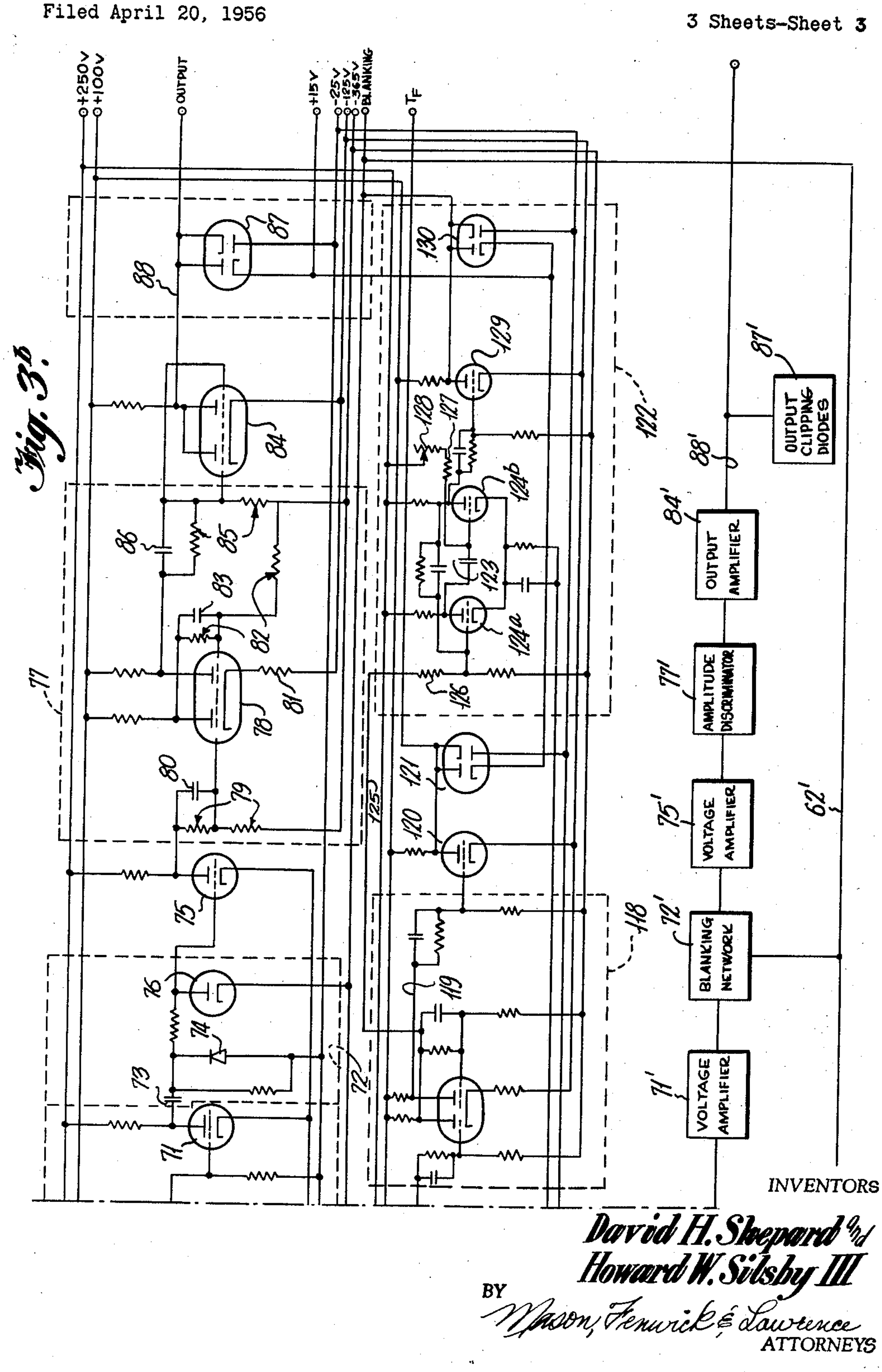

Referring specifically to Figures 3A and 3B, which together comprise a schematic circuit diagram of the present invention, there are depicted three parallel channels, indicated generally by reference characters 32, 33, and 34, which are respectively associated with the photomultiplier tubes 25 and 27 and the timing signal photocell 31. For convenience, the channels 32 and 33, associated with the photomultiplier tubes 25 and 27, will be designated video channels and the channel 34, associated with the timing signal photocell 31, will be termed the timing channel.

It should be apparent to persons skilled in the art that only one of the photomultiplier tubes 25, 27 and its associated channel 32, 33 may be employed, or the number of photocells and associated sensitivity control channels may be increased in accordance with different applications of the present invention and different scanning schemes, or that the simple photoelectric cell and sensitivity control channel, such as the photocell 31 and channel 34, may be employed as the character detection channel instead of the photomultiplier tubes 25, 27 and their associated channels, or that the character threshold adjustment circuitry of video channels 32, 33 may be integrated with the sensitivity control components of timing channel 34 and simple photocell 31 and the same substituted in entirety for either or both of the photomultiplier tubes 25, 27 and the video channels 31, 32.

As the photomultiplier tube 27 and its associated circuitry and video channel 33 are identical with the photomultiplier tube 25 and its associated circuitry and video channel 32, only the latter will be described in detail and the former has been depicted merely in block diagram form, with the stages of the former indicated by reference characters which are the primes of the reference characters designating corresponding stages in video channel 32.

The photomultiplier tube 25 is preferably of the conventional 9 dynode type, wherein the first 8 dynodes, as illustrated in Figure 3A, are tapped to different points along a voltage divider 35 which is between plus 250 and minus 500 volts and provides a voltage between adjacent dynodes of approximately 75 volts. It has been found that control of the voltage between one pair of dynodes of such a photomultiplier is sufficient to compensate for the variables which affect the output of scanning systems. In accordance with the present invention, the 9th dynode 36 is not connected to the voltage divider but is provided with a lead 37 which receives a control voltage from later described circuitry to vary the gain of the photomultiplier 25. The plate 38 of the photomultiplier 25 is coupled to plus 250 volts through a plate load resistor and develops a voltage output across the plate load resistor which is coupled to the grid of a cathode follower 39 to drive cable 40 and deliver signals to the video channel 32 which is usually located in a separate console.

The plate current of the photomultiplier tube 25 is proportional to the light intensity at the photocathode so that increase in light intensity will cause increase in plate current. Flow of this current through the plate load resistor coupled to the plate 38 will cause the output signal applied to the cathode follower 39 and delivered through the cable 40, to be most negative when light intensity is greatest. Thus, the "black pulse" and scanning of portions of a printed character on the document 13 will result in positive pulses above the background signal. Because the "black pulse" is caused by completely cutting off all light to the photomultiplier 25, while the pulses representing portions of the character in the scanning field will result from merely a darkening of the reflected light, the "dark pulse" will always be of greater amplitude than the character pulses.

The video channel 32 accomplishes automatic compensation of the output of the photomultiplier 25 by means of a two-step operation. The first step effects compensation for all variable factors in light intensity except character reflectivity, and for all photosensitivity factors in the photomultiplier 25 except variation of one operating potential, this being the operating potential of the 9th dynode 36. This compensation is achieved by deliberately changing the operating potential on dynode 36 to vary the photosensitivity or gain of the photomultiplier 25 to offset all variable factors except character reflectivity. The operating potential which is coupled along the lead 37 to dynode 36, which is termed the "dynode control voltage," is developed by a feedback circuit which is sensitive to the difference in potential between the portion of the scan signal delivered along the cable 40 which occurs when the scanning unit 10 sees no light, such as the "black pulse," and that portion of the output signal on the cable 40 which occurs when the scanning unit is looking at the document background. The signal which results from this compensation has a constant amplitude between the "black pulse" and background and thus corrects for all variables other than character reflectivity.

The second compensating step involves the automatic adjustment of the threshold above which a scanner output signal must rise in order to cause a video channel output signal. Pulses produced at the output of the photomultiplier 25, or on the cable 40 of the cathode follower coupled thereto, when the scanner sees a bit of a character in the scanning field are termed "recognition pulses." The threshold is made to follow the positive recognition pulse of greatest amplitude recently sensed, but is established at a relatively fixed voltage level below the recently seen recognition pulse of greatest amplitude. Additional means are provided to establish a preselected "grey" level which is lower than the normal amplitude of recognition pulses. The threshold normally follows recognition pulses, but in the absence of recognition pulses, it is set to the "grey" level by a grey pulse. Any pulse which exceeds the threshold will cause a video channel output pulse and any pulse which does not exceed the threshold will cause no output pulse from the video channel.

The channel recognition signal which is delivered along the cable 40 to the video channel 32 is of positive polarity, that is, both the "black pulse," produced between scans, and the recognition pulses, produced when any portion of a character in the scanning field is sensed during a scan, are positive pulses. These pulses are coupled along the cable 40 to a two-stage voltage amplifier 41 where the signals are amplified. The amplified signals are then fed to a cathode follower 42. The signal at the cathode of the cathode follower 42 is coupled through a coupling capacitor 43 to the grid of a contrast control tube 44 in the contrast control stage 45. The contrast control tube 44 is preferably a sharp cut-off pentode type 6AU6 whose control grid is biased to minus 25 volts. A type 2U1 clamping diode 46 is coupled between the control grid of the contrast control tube 44 and minus 25 volts to clamp the most negative portion of the signal applied to the control grid to the minus 25-volt level. The plate of the contrast control tube 44 is coupled to plus 250 volts by a load resistor 47 and is coupled to ground through a contrast control capacitor 48. In the preferred embodiment, the plate resistor 47 is 6.8 megohms and the capacitor 48 is a 0.5 mfd. A 3U1 selenium diode 49 is coupled between the upper end of the contrast control capacitor 48 and an intermediate point in a voltage divider 50 extending between plus 250 volts and ground to limit the maximum charge across the capacitor 48 to approximately 195 volts.

The cut-off voltage of the contrast control tube 44 in the preferred embodiment is approximately minus 5 volts. The amplitude of the "black pulse" delivered to the control grid of the tube 44 when the "black pulse" is produced at the output of the scanner is normally a little above 20 volts. Therefore, when the negative portion of the signal at the control grid of the contrast control tube 44, which represents the background reflectivity, is clamped at minus 25 volts by the clamping diode 46, the positive "black pulse" on the control grid of the tube 44 will exceed cut-off and cause the tube 44 to conduct during the duration of hte "black pulse," which discharges the contrast control capacitor 48 a certain amount. The magnitude of the voltage change on the contrast control capacitor 48 during this discharge through the tube 44 depends on the voltage by which the "black pulse" at the control grid of tube 44 exceeds cut-off because the "black pulse" is of uniform duration. Between "black pulses" the contrast control capacitor 48 charges slowly toward 250 volts through the load resistor 47, but this charging is limited to approximately 195 volts by the selenium diode 49. This limitation on the charging of the capacitor 48 is imposed to prevent the contrast control from raising the potential of dynode 36 above the potential of the photomultiplier plate 38 during momentary light interruption, which would cause the photomultiplier output to become inverted. The lead 37 extending from the dynode 36 is connected to the junction between the plate resistor 47 and the contrast control capacitor 48. As previously explained, the gain of the photomultiplier tube 25 is a current gain, caused by secondary emission effect repeated at each of the photomultiplier dynodes. The secondary emission is a function of dynode-to-dynode potential. The potential of the dynode immediately preceding dynode 36 is fixed. Therefore, variation of the potential at the junction between the plate resistor 47 and contrast control capacitor 48 which is coupled to dynode 36 by the lead 37 will effect a variation in the current gain of the photomultiplier 25, the current gain increasing as dynode 36 voltage increases.

If the "black pulse" amplitude at the control grid of contrast control tube 44 greatly exceeds contrast control cut-off, which is minus 5 volts in the preferred embodiment, the contrast control capacitor 48 will discharge more during the "black pulse" than it charges between "black pulses" and so the mean voltage on the lead 37 and the dynode 36 will be progressively lower. This progressively reduces the gain of the photomultiplier 25, thereby progressively decreasing the amplitude of the "black pulse" and amount of capacitor discharge, and therefore the voltage coupled to dynode 36, until a point of equilibrium is reached where the discharge during the "black pulse" will equal the charge between "black pulses." At this point, the amplitude of the "black pulse" on the control grid of contrast control tube 44 will be about 20 volts in the preferred embodiment.

As the "black pulse" amplitude is determined by the difference in the voltage levels of the scanner output signals when the scanner sees total darkness and when the scanner sees background, decreasing illumination intensity or decreasing document background reflectivity will reduce the difference between these voltage levels and, therefore, reduce the "black pulse" amplitude. If the "black pulse" amplitude fails to get above cut-off, the constant control tube 44 will not conduct. The voltage on the contrast control capacitor 48 and on dynode 36 will progressively increase toward the maximum potential of 195 volts since the contrast control tube 44 does not discharge the capacitor during a cycle. This increases the gain of the photomultiplier 25 and increases progressively the "black pulse" amplitude. This increase in sensitivity of the photomultiplier 25 will continue until the "black pulse" at the grid of tube 44 again goes above cut-off and a new equilibrium is reached. Again the "black pulse" amplitude will be about 20 volts. The action of the contrast control circuit provides a virtually constant amplitude "black pulse" over wide variations in light intensity, document reflectivity and photocell sensitivity.

The remaining portions of video channel 32 are designed to produce an arbitrary "grey" pulse which is of somewhat smaller amplitude than the normal amplitude of recognition pulses resulting from sensing of bits of a character to establish a minimum threshold level for character darkness and then suppress the arbitrary grey pulse from the output and reject recognition pulses of lower amplitude than this minimum threshold level in order to achieve optimum discrimination between signal and noise over wide variations in character blackness, and to elevate this threshold when recognition characters of greater amplitude are received to establish a threshold level which bears a preselected voltage relationship to the darkest character bit and, therefore, largest amplitude recognition pulse recently seen.

The "black pulse" which is used as the control reference by the contrast control stage 45 is caused by a complete absence of light striking the photomultiplier 25. Recognition pulses, which are produced upon detection of bits of a character, on the other hand, are of lesser amplitude than the "black pulse" because no printing process causes complete light absorption and all of the characters, therefore, will reflect some light. The recognition pulse amplitude is a product of the reduced reflectivity of the character relative to the reflectivity of the document background.

The "black pulse" may also be used to produce a reference source for establishing the minimum threshold level of the recognition threshold circuits. In order to operate the recognition threshold circuits on the largest recognition pulse, it is necessary to reduce the amplitude of the "black pulse" below the level of character pulses if this "black pulse" is to be used as a reference. The "black pulse" is rendered useful in the recognition threshold circuits by reducing its amplitude so that its peak represents an arbitrary "grey" level. This is accomplished by the "grey" level limiter nework 51, which produces a "grey" level pulse to prevent the recognition threshold circuit from clamping to the scanner output signal representing background reflectivity when no recognition pulses occur for several scans. The "grey" pulse does not prevent the threshold from being adjusted by recognition pulses which are of greater amplitude than the "grey" pulse.

To produce this "grey" level pulse, the signal from the cathode of the cathode follower 42 is also coupled along the lead 52 and through a coupling capacitor 53 to the upper end of a resistor 54 of the "grey" level limiter network 51. A 2U1 clamping diode 55 paralleling the resistor 54 clamps the most negative portion of this input signal to minus 17 volts. This potential is established by the potentiometer 56 and resistor 57 which act as a voltage divider between ground and minus 25 volts, the midpoint between the potentiometer 56 and the resistor 57 being connected to the plate of the diode 55. The input signal at the upper end of the resistor 54 is also coupled through a resistor 58 to the plate of a vacuum diode 59. The cathode of the diode 59 is interconnected with the cathode of a vacuum diode 60, the plate of the latter being connected to the movable arm of the potentiometer 56. The junction between the cathodes of the two vacuum diodes 59 and 60 is connected through a resistor 61 and lead 62 to a suitable source of negative blanking pulses which are at minus 25 volts commencing with the production of the timing signal $T_f$ until some time after the beginning of the following scan and then go to plus 15 volts until the next timing pulse $T_f$, the timing relation between the negative blanking pulse and the positive "black pulse" being such that the blanking pulse begins shortly before and lasts until after the "black pulse." When the video channel 32 of the present invention is employed with automatic character sensing apparatus having interpreter circuits which develop blanking signals of proper voltage and timed relation with the scan and $T_f$ pulses, the blanking pulse may merely be coupled to the cathodes of the vacuum diodes 59 and 60 along the lead 62 from the associated character sensing apparatus interpreter circuits. The video channel 32 may be rendered operative for straight scanning operations, however, by employing a blanking pulse generator such as is disclosed hereinafter in connection with the detail description of the timing channel 34 to produce the desired blanking pulse on the lead 62.

The negative blanking pulse which is delivered along the lead 62 attempts to pull the junction of the vacuum diodes 59 and 60 to minus 25 volts, but diode 60 whose plate is connected to the arm of the potentiometer 56 limits the voltage level of the junction to the "grey" level potential set by the potentiometer 56. The effect of the vacuum diode 50 is to clip the "black pulse" to the potential at the junction of the cathodes on the diodes 59 and 60. Any recognition pulse arising from sensing of a character bit during the blanking time will also be clipped to the "grey" level. The output of "grey" level limiter network 51 is fed directly to the grid of the cathode follower 63, whose cathode is coupled through a coupling capacitor 64 and the grid resistor 65 to the control grid of a clipping amplifier tube 66 in the recognition threshold stage 67. A potentiometer 68 and resistor 69 form a voltage divider between plus 100 and minus 25 volts and a 2U1 clamping diode 70 paralleled by a 180K resistor 70' is connected between the input end of the grid resistor 65 and the arm of potentiometer 68 to clamp the top of the most positive signal in the input signal wave form to the voltage set by the potentiometer 68 and resistor 69. Adjustment of the potentiometer 68 sets the amount by which the top of the most positive signal will exceed cut-off of the clipping amplifier 66. Any signal which exceeds cut-off will cause a corresponding signal in the output of the clipping amplifier 66. The voltage to which a recognition pulse occurring upon sensing of a character bit must rise in order to cause an output signal at the output of the clipping amplifier 66 depends on the amplitude of the pulses which have preceded it. If the preceding recognition pulses in any of the last several scans were large, then only those recognition pulses which are nearly as large will rise above cut-off of the clipping amplifier 66 since the clamping diode has clamped the most positive recent preceding signal to the voltage set by the potentiometer 68 and resistor 69. If the recent preceding recognition pulses were small, then relatively smaller pulses will bring the clipping amplifier 66 into conduction as compared with those which will be passed when a large pulse preceded, as the lower level of the clamped signal in this situation is at a relatively higher voltage level. If no recognition pulses are seen for a number of scans, then the "grey" pulse will be clamped by the clamping diode. Proper adjustment of the "grey" pulse prevents the recognition threshold from dropping to a point where noise will cause false recognition pulses.

The time constant characteristics of the clamping circuit are such that the clamping circuit will respond instantaneously to clamp upon the top of more positive signals as they arrive but is slow to clamp upon the top of successively less positive signals due to the discharge of coupling capacitor 64 through the resistor 70' so as to clamp appreciably less positive succeeding pulses only after a number of scans have elapsed following a materially more positive pulse.

The output of the recognition level clipping amplifier 66 is directly coupled to an inverting amplifier 71. Since the "grey" pulse and recognition pulses at the output of the clipping amplifier 66 are negative, the "grey" pulse and recognition pulses at the output of the inverting amplifier 71 are positive. The signal at the output of the inverting amplifier 71 is coupled to a blanking network 72 through a coupling capacitor 73. The negative portion of the signal coupled to the blanking network 72 is clamped to minus 25 volts by a 3U1 selenium diode 74 and is connected to the grid of a voltage amplifier 75. The plate of a vacuum diode 76 is connected to the grid of the voltage amplifier 75 and its cathode is coupled directly to the blanking signal lead 62 so that the grid of the voltage amplifier 75 is held at minus 25 volts during the blanking pulse. In this way, only those pulses which occur between blanking pulses will reach the output of the voltage amplifier 75.

Ideal scanner pulses should be square pulses with zero rise and fall times. However, in practice, as with the scanning unit hereinbefore disclosed, the scanning slits have finite width so that the character of the light received at the photomultiplier does not change instantaneously. Because of the geometry of the scanning system, the scanner output pulses are trapezoidal in shape. An amplitude discriminator 77 of the Schmidt trigger type is therefore employed to develop square pulses from the output of the voltage amplifier 75.

The plate of the voltage amplifier 75 is connected to the input grid of the dual triode tube 78 of the amplitude discriminator of the preferred embodiment through a voltage divider 79, consisting of a 360K resistor and a 620K resistor connected at the lower end to minus 365 volts. A 10 mmfd. capacitor 80 parallels the 360K resistor as a speed-up capacitor to balance the effective grid-to-cathode capacitance of the input triode section of the tube 78 which is effectively in parallel with the 620K resistor. The balancing capacitor 80 makes the action of the voltage divider 70 independent of frequency. When the voltage amplifier 75 is cut off between recognition pulses the input grid of the amplitude discriminator tube 78 is at about plus 17 volts as established by the voltage divider 79 and the input side of the tube 78 will conduct. When voltage amplifier 75 is conducting during recognition pulses, the input grid of the amplitude discriminator tube 78 is about minus 120 volts. The cathode of the tube 78 is connected to minus 125 volts through a large unbypassed cathode resistor 81, and the plate of the input side is coupled to the grid of the output side of tube 78 by a voltage divider 82 consisting of a 180K resistor and a 620K resistor, the 180K resistor being paralleled by a 10 mmfd. speed-up capacitor 83.

The large unbypassed cathode resistor 81 causes the cathode to follow the input grid of tube 78 by cathode follower action. When the input side of the tube 78 is conducting between character pulses, the grid of the output side is held below cut-off by the plate of the input side. As long as the output side is cut off, the output of the amplitude discriminator is high. As a scan pulse of trapezoidal shape reaches the voltage amplifier tube 75 the plate voltage of that tube begins to drop, causing the voltage of the input grid of the amplitude discriminator tube 78 to drop. As the input grid voltage on tube 78 drops, the cathode voltage goes down and the plate voltage rises, producing a rising voltage on the gird of the output side of the tube 78. This process is regenerative so that transfer from input side conduction to output side conduction is very rapid, causing a very steep negative slope on the output side plate voltage output. When the scanner signal terminates, the voltage amplifier 75 goes out of conduction and the voltage on the input grid of the amplitude discriminator 78 begins to rise. Regenerative action opposite to that which is described takes place by which conduction is very quickly transferred from the output side of the tube 78 to the input side, producing a steep positive slope in the output wave form. The effect of the amplitude discriminator 77 is to develop a negative pulse of very short rise and fall times under control of a trapezoidal negative pulse applied to its input. Because the voltages at which the amplitude discriminator 77 switches from input side conduction to output side conduction are fixed, the time duration of the output pulse is determined by the length of time that the input pulse is below these voltages. Thus, the output pulse duration is directly related to the time required for the scanning unit to scan a character portion.

The negative pulse at the output of the amplitude discriminator 77 is directly coupled to an output inverter 84 through a voltage divider 85 consisting of a 240K resistor and a 300K resistor connected between the plate of the output side of the amplitude discriminator tube 78 and minus 365 volts, the 240K resistor being also paralleled by a 10 mmfd. speed-up capacitor 86. The output inverter 84 is a simple voltage amplifier which is preferably a 6J6 triode with both sides connected in parallel. A pair of output limiter clipping diodes 87 are connected between the output of the inverter 84 on the lead 88 and plus 15 volts and minus 25 volts to prevent the inverter output from exceeding plus 15 volts or from going below minus 25 volts.

The video channel 33 consists of stages which correspond precisely with the above-described stages of video channel 32 for performing corresponding functions in connection with the photomultiplier 27.

The timing channel 34 operates in a somewhat similar fashion to video channels 32 and 33 to develop automatic sensitivity control voltages for regulating the sensitivity of the timing photocell 31 which is a simple two-element photocell, and shapes the pulses and clips the output between standard voltages. Since the timing photocell 31 in the present embodiment is not exposed to characters or character images, no threshold adjusting functions are incorporated in the timing channel 34.

The plate 90 of the timing photocell 31 derives its operating voltage from a lead 91 in a manner to be hereinafter described and is likewise coupled through a coupling capacitor 92 to the grid of a cathode follower 93 for driving a cable 94 by which the signal on the cathode of the cathode follower 93 is delivered to a separate console. The output signal of the cathode follower 93 on the cable 94 is proportional to and of the same polarity as the pulse produced at the plate 90 of the timing photocell 31. A negative pulse is produced at the plate 90 of the photocell 31 and at the cathode of the cathode follower 93 when the radial slit of light from the exciter lamp 28 transmitted by the slit 30 of the bracket 29 is passed by a radial slit 19 of the scanning disk 17 and strikes the photocathode of the photocell 31, which increases the electron emission from the photocathode of the photocell 31 increasing conduction in the photocell for the duration of the passage of light through the slit 19 and produces a negative pulse of like duration. The signal on the cable 94 is amplified by a two-stage voltage amplifier 95 consisting of two sections of a 12AX7 tube. The output of the second section of the voltage amplifier 95, which is again a negative pulse corresponding in time to the negative pulse on the cable 94, is fed to a voltage stabilized amplifier 96 comprising preferably a 6AU6 tube. The output of the voltage stabilized amplifier 96 is coupled to the grid of a cathode follower 97, and the cathode of the cathode follower is coupled through lead 98 and resistor 99 and speed-up capacitor 100 to the control grid of the voltage stabilized amplifier 96 to feed back the cathode follower output to the grid of the voltage stabilized amplifier 96. Since the signal fed back from the cathode follower 97 to the voltage stabilized amplifier 96 is the inverse of the input signal on the grid of amplifier 96, the effect of the feedback is degenerative and amplifier 96 is stabilized thereby. The positive pulse at the cathode of the cathode follower 97 is also coupled through a coupling capacitor 101 to the control grid of the tube 102 of a contrast control circuit 103. A 2U1 clamping diode 104 is connected between the control grid of the contrast control tube 102 and the junction between a 1K resistor 105 and a 2.7K resistor 106 connected between ground and minus 25 volts to establish a voltage of approximately minus 18 volts at the anode of the clamping diode 104 and clamp the negative portion of the signal on the control grid of contrast control tube 102 at minus 18 volts. A 270K plate resistor 107 is connected between the plate of the contrast control tube 102 and plus 250 volts and is paralleled by a contrast control capacitor 108 of .02 mfd. The amplitude of the timing pulse on the grid of tube 102 produced when the timing photocell 31 seems light through the radial slits 19 and 30 is normally such as to just exceed cut off of the contrast control tube 102 when the negative portion of the signal at the control grid is clamped at minus 18 volts. When the contrast control tube 102 is conducting, it charges the contrast control capacitor 108 and between pulses the capacitor 108 discharges toward plus 250 volts through the plate resistor 107.

The plate of the contrast control tube 102 will reach a point at which the charge of the contrast control capacitor 198 during timing signal pulses will just equal the discharge between such pulses. A voltage divider 109 formed of an 8.2 meg. resistor 110 and a 2.2 meg. resistor 111 is connected between the plate of the contrast control tube 102 and minus 25 volts and the control voltage lead 91 extending from the plate 90 of the photocell 31 is connected through a resistor 112 to the junction between the resistors 110 and 111. This junction will normally be a few volts positive, and a 2U1 clamping diode 113 connected between this point and ground prevents this point from going below ground. The small positive voltage established at the junction between the resistors 110 and 111 of the voltage divider 109, which is used for the plate voltage of the photocell 31, is at a point on the operating characteristics of the photocell 31, which is preferably a 1P42 photocell, so that a small increase in plate voltage will cause a large increase in sensitivity. The effect of the contrast control circuit 103 is to reduce the plate voltage of the timing photocell 31 when the output timing pulse is too large and to increase the photocell plate voltage when the output timing pulse is too small. The change in plate voltage of the photocell 31 causes a correcting change in sensitivity so that the timing pulse $T_f$ is maintained virtually constant in amplitude.

As a result of the action of the contrast control circuit 103 a virtually constant output timing pulse is produced at the cathode of the cathode follower 97. This signal is coupled to an inverter 114 through a coupling capacitor 115. The inverter 114 is biased beyond cut-off by a voltage divider 116, preferably formed of a 1K resistor and a 1.5K resistor connected between ground and minus 25 volts, to establish a voltage at their junction of minus 10 volts. The timing input pulses on the grid of the inverter 114 cause negative pulses in the plate output of the inverter 114.

The pulses at the plate of the inverter 114 are trapezoidal in shape due to the geometry of the pulse generating optical system for the same reason that the "black pulses" and character recognition pulses in the video channels 32 and 33 are trapezoidal so that these pulses are coupled along a lead 117 to a Schmidt trigger amplitude discriminator 118 to produce square negative output pulses. Operation of the amplitude discriminator 118 is identical with operation of the amplitude discriminator 77 in the video channel 32.

The square negative pulses on the output lead 119 of the amplitude discriminator 118 are fed to an output amplifier 120 and to a pair of output limiting clipping diodes 121 which clip the output between the standard output voltages of plus 15 and minus 25 volts in the same way the clipping diodes 87 clip the output of the video channel 32.

There is also incorporated in the timing channel 34 a blanking pulse generator for producing blanking pulses for use in the video channels 32 and 33, in the event the present invention is not used with character sensing equipment having interpreter circuits which produce blanking signals, in order to render the present invention operative for straight scanning applications. The blanking pulse generator, which is generally indicated by the reference character 122, comprises a single-shot multivibrator 123 of conventional form having a dual triode including an input section 124A and an output section 124B. The input section 124A is normally non-conducting. The square positive pulse which occurs at the plate of the input side of the amplitude discriminator 118 is connected by the lead 125 through a voltage divider 126 to the grid of the normally nonconducting section 124A of the single-shot multivibrator 123. This positive pulse brings the normally non-conducting input section 124A into conduction and causes a plate voltage drop in the section 124A which is coupled ot the grid of normally conducting output section 124B in conventional fashion to cut off section 124B and cause a plate voltage rise in section 124B which holds the grid of the input section 124A conducting after the positive pulse originally coupled thereto has ceased. The grid of output section 124B which is now cut off, relaxes toward plus 250 volts through a 100K resistor 127 and a 1 meg. potentiometer 128. The time required for the grid of the output section 124B to rise above cut off will depend upon the setting of the potentiometer 128. When the output section 124B comes into conduction, the regenerative action of the multivibrator, due to the negative plate swing of the output section 124B which is coupled back to the grid of the input section 124A, drives the grid of section 124A again below cut-off. The multivibrator 123 then remains in this condition until another positive pulse is received along the lead 125.

The positive pulse which is thus produced at the plate of the output section 124B of the multivibrator 123, which begins in coincidence with the beginning of the timing pulse $T_f$ and continues until the grid of the output section 124B has returned above cut-off, is coupled to the grid of a blanking amplifier 129, and the inverted output of the blanking amplifier 129 is coupled through a pair of clipping diodes 130 which clip the output between plus 15 volts and minus 25 volts. The output pulse is at minus 25 volts during the blanking time and at plus 15 volts between blanking pulses.

To summarize the operation of the above-disclosed video and timing channels 32—34, light from the document background which is a product of document background reflectivity, which is transmitted through the radial slits 19 of the scanning disk 17 and fixed slits 21 and 22, impinges upon the photo-cathodes of the photomultipliers 25 and 27 during each scanning cycle and produces maximum relative photocathode current and therefore, the most negative voltage level at the plate 38 of the photomultipliers 25 and 27. During occurrence of a "black pulse" or when a bit of a character is imaged on the intersection of the radial slit 19 and fixed slits 21 and 22, the photomultiplier current drastically reduces over the period of the "black pulse" or bit of character detection, producing a positive rise or pulse at the plates 38 of the photomultipliers 25, 27. This photomultiplier output signal is fed through the cathode follower 39, two-stage voltage amplifier 41 and cathode follower 42, or the corresponding stages 39', 41' and 42' of video channel 33, to the control grid of the contrast control tube 44 or a like tube in the contrast control stage 45' of the video channel 33. As the operation of the stages of video channels 32, 33 are identical, the succeeding portion of the description of operation will be confined, for convenience, to video channel 32. The most negative portion of the signal on the control grid of contrast control tube 44, which is representative of the response of photomultiplier 25 to document background light intensity level, is clamped by the clamping diode 46 to minus 25 volts. This has the effect of rendering the background light intensity level apparently constant, and results in a variation of the amplitude of the "black pulse" from this apparently constant background level in accordnace with the difference between the photomultiplier response to the "black" period and its response to background. As previously described, contrast control capacitor 48 discharges during the period the contrast control tube 44 is driven above cut-off by the positive "black pulses" on the grid thereof and charges toward plus 195 volts when the tube 44 is non-conducting. Therefore, the discharging current of the contrast control capacitor 48 increases in relation to increase of the extent to which the "black pulse" exceeds cut-off so that the greater the "black pulse" amplitude exceeds cut-off, the more the capacitor 48 will discharge to progressively reduce the voltage at the junction between the capacitor 48 and resistor 47. As this junction is tied through the lead 37 to the 9th dynode 36 of the photomultiplier 25, the gain of the photomultiplier 25 will be progressively reduced, thereby progressively reducing the amplitude of the "black pulse" due to this reduced photomultiplier sensitivity, until a state of equilibrium is reached. The voltage of this junction and of dynode 36 is increased progressively if the amplitude of the "black pulses" on the grid of the contrast control tube 44 fails to exceed cut-off or to equal the equilibrium "black pulse" amplitude level, resulting in a lower or no discharge current for capacitor 48 and progressively increasing voltage on dynode 36 to progressively increase the sensitivity or gain of photomultiplier 25.

The "black pulses" at the cathode of cathode follower 42 are also coupled by lead 52 through the "grey" level limiter network 51 which clips the "black" and all character pulses received during the period of the blanking pulse on the blanking lead 62 to an arbitrary voltage level representative of a minimum threshold character blackness as determined by the adjustment of the potentiometer 56. These "grey" pulses are coupled through cathode follower 63, an R-C coupling network, and applied to the clipping amplifier 66 of the recognition threshold circuit 67 along with character recognition pulses which occur during the period between the blanking pulses.

The clamping diode 70 is connected between the output plate of the capacitor 64 and the arm of the potentiometer 68 in such a way as to clamp the tops of the positive pulses coupled through the capacitor 64 to the voltage level at the arm of potentiometer 68. This, in effect, fixes the voltage level of the tops of the positive pulses applied to the grid of the clipping amplifier 66 and permits the base or negative portions of this signal to be raised or lowered in voltage in accordance with the amplitudes of the pulses. This clamping network automatically clamps the most positive signal seen during the last several scans to the voltage level established at the arm of the potentiometer 68, since the occurrence of only smaller amplitude pulses for several scans after a larger amplitude pulse occurs cannot immediately re-establish a new clamping level because of the time constant characteristics of the clamping circuit. The adjustment of the potentiometer 68 sets the amount by which the most positive signal will exceed cut-off of the clipping amplifier 66. Therefore, the amplitude which a character recognition pulse must have in order to produce an output signal at the clipping amplifier 66 depends on the amplitude of the pulses which have preceded it for several scans. If the preceding pulses are large, then the base or lower level of the signal, as established by the clamping network, will be low and only those pulses which are nearly as large as the most positive recently preceding pulse will rise above cut-off and produce an output from the clipping amplifier 66. If the preceding pulses for several scans have been small, then the lower level of the signal at the grid of the clipping amplifier 66 will be high and small pulses will rise above cut-off of the tube 66.

The output of the clipping amplifier 66 is coupled through the inverting amplifier 71 and the blanking network 72. The negative portion of the signal is clamped to minus 25 volts by the selenium diode 74 and the grid of the voltage amplifier 75 is held to minus 25 volts during occurrence of the blanking pulse by vacuum diode 76 to permit only those pulses which occur between blanking pulses to reach the output of the voltage amplifier 75.

Such output pulses are sharpened into square pulses by the Schmidt trigger amplitude discriminator 77 and are inverted by inverter 84 and clipped between minus 25 and plus 15 volts by the clipping diodes 87 to produce output character recognition output pulses of desired amplitude and shape.

The timing channel 34 controls the sensitivity of the timing signal generating photocell 31 by amplifying and inverting the negative timing pulse produced at the plate of the timing photocell 31 when light is received from the exciter lamp 28, by coupling the output signal through the two-stage voltage amplifier 95 and voltage stabilized amplifier 96, and applying the positive timing pulses occurring at the cathode of the cathode follower 97 to the grid of the contrast control tube 102. The negative portion of the signal at the grid of the contrast control tube 102 is clamped by the clamping diode 104 to minus 18 volts, so that timing pulses $T_f$ of normal amplitude will just exceed cut-off of the contrast control tube 102. The voltage occurring at the junction of the voltage divider 109 in the plate circuit of the contrast control tube 102, as determined by the charge and discharge periods of the contrast control capacitor, which in turn are governed by the extent the timing pulses exceed cut-off of tube 102, is employed as the plate voltage for the timing photocell 31 so that variations in this voltage will produce variations in photocell sensitivity to maintain the amplitude of the timing pulses $T_f$ virtually constant.

The over-all effect of the above-described system is to compensate for all variables which will affect the amplitude of the character recognition pulses as a result of variations in document illumination intensity, document background reflectivity, and variations in photocell sensitivity, and to produce uniform amplitude timing signal pulses $T_f$. The automatic threshold adjustment portions of the video channels 32 and 33 automatically adjust the threshold above which a scanner recognition signal must rise in order to cause a video channel output signal in accordance with the amplitude of recognition pulses recently seen during the last several scans or the arbitrary "grey" pulse, whichever is greater, and thus substantially correct for variables in character reflectivity and provide optimum discrimination between signal and noise over substantial variations in character blackness. It will be appreciated from the foregoing description that the sensitivity control features of timing channel 34 may be substituted for the sensitivity control features of the video channels 32 and 33 if it is desired to adapt the video channels for use with simple photocells having but two elements. Specifically, the photocell 31 cathode follower 93, two-stage voltage amplifier 95, voltage stabilized amplifier 96, cathode follower 97 and contrast control stage 103 of the timing signal generating components may be substituted for the photomultiplier 25, cathode follower 39, two-stage voltage amplifier 41, cathode follower 42, and contrast control circuit 45 in video channel 32 to adapt the video channel for production of accurately regulated character recognition output pulses when a simple photocell is employed to sense the character bits in the scanning field. The blanking pulse generator 122, as has been previously mentioned, need not be used with the video channels 32 and 33 if the video channels are associated with character sensing apparatus of the conventional types wherein the interpreter circuits produce blanking pulses which may be used to perform the blanking functions in the video channels 32 and 33.

While but one specific embodiment has been illustrated in detail in the accompanying drawings and a modified embodiment has been described herein, wherein video channels 32 and 33 may be adapted to effect automatic sensitivity control and automatic character threshold adjustment with simple photocells of the dual element type employed to sense the scanning field, it is apparent that other modifications may be made in the invention without departing from the spirit and scope thereof, and it is desired, therefore, that only such limitations shall be placed thereon as are imposed by the prior art and are set forth in the appended claims.

We claim:

1. The method of controlling the gain of a photosensitive device comprising exposing the photosensitive device periodically to a source of fixed light intensity producing a greater amplitude voltage response at the output of said device than the response produced by any portion of the subject field to be sensed by the device, exposing the photosensitive device to a subject field, detecting the difference between the voltage levels of the most positive response and most negative responses at the output of the device, comparing said detected difference with a selected reference difference, and applying a control voltage derived from the comparison of said differences to the photosensitive device to vary gain thereof in a direction to bring said detected difference into correspondence with said standard difference.

2. The method of controlling the gain of a photosensitive device comprising masking the photosensive device periodically to shield all light therefrom and produce a reference pulse at the output of said photosensitive device, exposing the photosensitive device to a subject field, detecting the difference between the voltage levels of the reference pulse and the most negative response at the output of the photosensitive device produced when the photosensitive device is exposed to the subject field, producing a control voltage bearing a preselected relation to the departure of the difference between the voltage levels of said reference pulse and said most negative response from a selected difference between them, and applying said control voltage to said photosensitive device to vary the gain thereof in a direction to bring said detected difference into correspondence with said preselected difference.

3. The method of controlling the gain of a photosensitive device in a scanning system for sensing characters on character-bearing documents, comprising masking the photosensitive device periodically to shield all light therefrom and produce a reference pulse at the output of said photosensitive device, exposing the photosensitive device to a document in the scanning field, detecting the difference between the voltage levels of the reference pulse and the most negative response at the output of the photosensitive device indicative of document background light intensity produced when the photosensitive device is exposed to the background portion of the document in the scanning field, producing a control voltage bearing a preselected relation to the departure of the difference between the voltage levels of said reference pulse and said most negative response from a selected difference between them, and applying said control voltage to said photosensitive device to vary the gain thereof in a direction to bring said detected difference into correspondence with said preselected difference.

4. The method of controlling the gain of a photomultiplier tube in a scanning system for sensing characters on character-bearing documents, comprising masking the photomultiplier tube periodically to shield all light therefrom and produce a reference pulse at the output of said photomultiplier tube, exposing the photomultiplier tube to a document in the scanning field, detecting the difference between the voltage levels of the reference pulse and the most negative response at the output of the photomultiplier tube indicative of document background light intensity produced when the photomultiplier tube is exposed to the background portion of the document in the scanning field, producing a control voltage bearing a preselected relation to the departure of the difference between the voltage levels of said reference pulse and said most negative response from a selected difference between them, and applying said control voltage to one dynode of said photomultiplier tube to vary the gain thereof in a direction to bring said detected difference into correspondence with said preselected difference.

5. A circuit for controlling the gain of a photosensitive device comprising means for exposing the photosensitive device to a subject field, means for producing output signals of negatively progressing voltage with increasing light intensity in the field, means for exposing the photosensitive device periodically to a source of fixed light intensity producing a more positive voltage response at the output of the photosensitive device than the response produced by any portion of the subject field, means for detecting the difference between the voltage levels of the most positive and most negative response at the output of the photosensitive device, means responsive to the departure of said difference from a selected difference therebetween to produce a control voltage and apply the same to the photosensitive device to vary the gain thereof in a direction to bring said detected difference into correspondence with said selected device.

6. A circuit for controlling the gain of a photoelectric device for scanning a field and producing output voltages which progress negatively with increasing light intensity in the field comprising means for shielding said photoelectric device from said scanning field periodically to produce a reference pulse of more positive voltage than the voltage output produced for any portion of the scanning field, means responsive to said reference pulse and the voltage output of said photoelectric device during scanning for producing a voltage pulse representative of the difference between the voltage levels of said reference pulse and the most negative voltage output from said photoelectric device, means for producing a control voltage to vary the gain of the photoelectric device, and means regulating said control voltage producing means in accordance with the extent said difference varies from a preselected pulse amplitude to vary the gain of said photoelectric device in a direction to eliminate departure of said difference pulse from said preselected pulse amplitude.

7. A circuit for controlling the gain of a photoelectric device for scanning character-bearing documents and the like and producing output voltages which vary inversely with the light intensity sensed thereby comprising means for imaging portions of the character-bearing documents onto the photoelectric device, means for shielding said photoelectric device periodically from all light to entrain with the output thereof reference pulses of more positive voltage than the voltage output produced for any portion of the scanning field, negative clamping means for clamping the most negative output from said photoelectric device representative of the light reflected from the document background to a preselected voltage level, means for producing a control voltage and applying the same to said photoelectric device for regulating the gain thereof, and means responsive to the departure from a preselected pulse amplitude of the voltage amplitude of said reference pulse in said output clamped to said preselected voltage level to vary the control voltage produced by said control voltage producing means in a direction to vary the gain of said photoelectric device to bring said reference pulse amplitude into correspondence with said preselected pulse amplitude.

8. The combination recited in claim 7 wherein said means for producing said control voltage comprises a capacitor circuit having one plate coupled to said photoelectric device to control the gain thereof in accordance with the voltage across said capacitor, and said means for regulating the same comprises normally non-conductive vacuum tube means which is rendered conductive throughout the portion of said reference pulse in said clamped output exceeding a preselected voltage level to establish a discharge path for said capacitor to vary the voltage applied from said capacitor to said photoelectric device in a direction to establish a preselected equilibrium condition in said capacitor circuit.

9. The combination recited in claim 7 wherein said photoelectric device is a photomultiplier tube having a plurality of dynodes, and said control voltage is applied to only one of said dynodes.

10. The combination recited in claim 7 wherein said photoelectric device is a photocell having only a photocathode and an anode, and said control voltage is applied to the anode of said photocell.

11. Apparatus for amplitude discrimination of output signals of a photosensitive scanning device produced upon sensing of a scanning field comprising means responsive to the amplitudes of said signals for establishing a threshold signal amplitude proportional to the maximum output signal amplitude resulting from the minimum light intensity portion of the scanning field sensed by said device, means for nullifying the scanning device output signals having smaller amplitudes than said threshold signal amplitude, means retarding response of said threshold amplitude establishing means to reducing maximum output signal amplitudes.

12. Apparatus for amplitude discrimination of output signals of a photosensitive scanning device produced upon sensing of a scanning field comprises means responsive to the amplitudes of said signals for establishing a threshold signal amplitude proportional to the maximum output signal amplitude resulting from the minimum light intensity portion of the scanning field sensed by said device, means for nullifying the scanning device output signals having smaller amplitudes than said threshold signal amplitude, means producing a substantial time constant lag in the response of said threshold amplitude establishing means to reducing maximum output signal amplitudes, and means for maintaining said threshold signal amplitude above a selected minimum value.

13. Apparatus for amplitude discrimination of output signals of a photosensitive scanning device produced upon sensing of a scanning field comprising means for establishing a threshold signal amplitude proportional to the maximum output signal amplitude resulting from the minimum light intensity portion of the scanning field sensed by said device, means for nullifying the scanning device output signals having smaller amplitudes than said threshold signal amplitude, said threshold amplitude establishing means being substantially instantaneously responsive to increasing maximum output signal amplitudes, means producing a substantial time constant lag in the response of said threshold amplitude establishing means to reducing maximum output signal amplitudes, means for producing standard amplitude signals of a selected minimum threshold amplitude, and means for applying said standard amplitude signals to said threshold amplitude establishing means to establish the threshold signal amplitude when no scanning device output signal amplitude exceeds said standard signals for a selected time period.

14. Apparatus for amplitude discrimination of output pulses of a photoelectric scanning device produced responsive to sensing of portions of dark characters and the like in a scanning field comprising means responsive to the amplitudes of said output pulses for establishing a threshold voltage level bearing a selected relation to the voltage level of the maximum output pulse amplitude produced from the darkest character portion sensed by said scanning device during a selected number of scanning cycles, means regulated by said threshold voltage level for producing pulses from said scanning device output pulses only when their amplitudes exceed said threshold voltage level, and means for maintaining said threshold voltage level above a preselected minimum value.

15. Apparatus for amplitude discrimination of output pulses of a photoelectric scanning device produced responsive to sensing of portions of dark characters and the like in a scanning field comprising means for establishing a threshold voltage level bearing a selected relation to the voltage level of the maximum output pulse amplitude produced from the darkest character portion sensed by said scanning device, means regulated by said threshold voltage level for producing pulses from said scanning device output pulses only when their amplitudes exceed said threshold voltage level, means rendering said threshold voltage level establishing means substantially instantaneously responsive to greater output pulse amplitudes and retarding response of the same to output pulses of smaller amplitude than the last preceding maximum output pulse amplitude, and means for maintaining said threshold voltage level above a preselected minimum value.

16. Apparatus for use with character sensing apparatus to compensate for variations in character reflectivity and illumination, said character sensing apparatus including photoelectric scanning means for sensing portions of characters on character bearing documents and producing output pulses upon sensing of character portions comprising means for establishing a threshold voltage level bearing a selected relation to the output pulse of greatest amplitude produced from the darkest character portion sensed by said scanning means, means regulated by said threshold voltage level for translating said scanning device output pulses into discriminated output pulses only when their amplitudes exceed said threshold voltage level, means rendering said threshold voltage level establishing means substantially instantaneously responsive to subsequent output pulses of greater amplitude and retarding response of said establishing means to output pulses of smaller amplitude than the last preceding maximum scanning device output pulse amplitude until such smaller amplitude pulses have persisted for sufficient duration to enable said scanning device to scan at least a substantial portion of a character, and means for maintaining said threshold voltage level above a preselected minimum value.

17. Apparatus for regulating the scanning output of character sensing apparatus to compensate for variations in character reflectivity and illumination, said character sensing apparatus including photoelectric scanning means for sensing portions of characters on character bearing documents and producing output pulses upon sensing of character portions comprising normally non-conductive vacuum tube means including a control grid, means for applying the output signal of said scanning means to said control grid, clamping means clamping the tops of the most positive output pulses applied to said control grid to a selected voltage level lying slightly above the cut-off voltage level of said vacuum tube means for rendering said vacuum tube means operative to produce discriminated output pulses only for pulses applied to said control grid exceeding a pulse amplitude slightly below said most positive output pulse, means rendering said clamping means operative to clamp substantially instantaneously on the tops of positive pulses of greater amplitude than the pulse establishing the existing clamping condition of said clamping means, resistor-capacitor discharge means retarding clamping of said clamping means to the tops of output pulses of smaller amplitude than the clamped condition thereof until such smaller amplitude pulses persist for a scanning period of at least a major portion of a character, and means establishing a minimum clamping voltage level for said clamping means.

18. Apparatus for regulating the scanning output of character sensing apparatus to compensate for variations in character reflectivity and illumination, said character sensing apparatus including photoelectric scanning means for sensing portions of characters on character bearing documents and producing output pulses upon sensing of character portions comprising normally non-conductive vacuum tube means including a control grid, means for applying the output signal of said scanning means to said control grid, clamping means clamping the tops of the most positive output pulses applied to said control grid to a selected voltage level lying slightly above the cut-off voltage level of said vacuum tube means for rendering said vacuum tube means operative to produce discriminated output pulses only for pulses applied to said control grid exceeding a pulse amplitude slightly below said most positive output pulse, means rendering said clamping means operative to clamp substantially instantaneously on the tops of positive pulses of greater amplitude than the pulse establishing the existing clamping condition of said clamping means, resistor-capacitor discharge means retarding clamping of said clamping means to the tops of output pulses of smaller amplitude than the clamped condition thereof until such smaller amplitude pulses persist for a scanning period of at least a major portion of a character, means for periodically producing a minimum reference pulse bearing an amplitude relation to scanning means output pulses representative of minimum character darkness, means for entraining said reference pulses with said scanning device output pulses and applying the same to said control grid to clamp said clamping means onto the tops of said reference pulses when the amplitudes of said scanning device output pulses are less than the amplitudes of said reference pulses for a selected time period, and means for selectively eliminating said minimum reference pulse from the output of said apparatus.

19. The combination recited in claim 18 wherein said reference pulse producing means comprises means for producing periodic scanning means output pulses of standard amplitude intermediate scanning of document areas, and means for clipping said periodic output pulses to a preselected amplitude representative of scanning means output pulse amplitudes resulting from detection of character portions of selected minimum character darkness.

20. Apparatus for producing discriminated output pulses from a photoelectric scanning device of automatic character sensing apparatus sensing portions of dark characters and the like and producing positive scanning device output pulses whose amplitudes increase with increasing character darkness comprising means for exposing the scanning device periodically to a source of fixed light intensity producing reference output pulses of greater amplitude than the amplitudes of scanning device output pulses resulting from sensing of the scanning field, means for detecting the difference between the voltage levels of the tops of said reference pulses and of the most negative output response of said scanning device during a scanning cycle, means responsive to the departure of said difference from a selected difference therebetween for producing a scanning device control voltage, means for applying said scanning device control voltage to said scanning device to vary the gain thereof in a direction to bring said detected difference into correspondence with said selected difference, means for establishing a threshold voltage level bearing a selected relation to the maximum output pulse amplitude produced from the darkest character portion sensed by said scanning device, means regulated by said threshold voltage level for producing discriminated pulses from said output pulses only when the output pulse amplitudes exceed said threshold voltage level, and means rendering said threshold voltage level establishing means substantially instantaneously responsive to greater output pulse amplitudes resulting from character portion detection and retarding response of the same to output pulses of smaller amplitude than the last threshold voltage level establishing pulse.

21. Apparatus for producing discriminated output pulses from a photoelectric scanning device of automatic character sensing apparatus sensing portions of dark characters and the like and producing positive scanning device output pulses whose amplitudes increase with increasing character darkness comprising means for exposing the scanning device periodically to a source of fixed light intensity producing reference output pulses of greater amplitude than the amplitudes of scanning device output pulses resulting from sensing of the scanning field, means for detecting the difference between the output voltage levels of said scanning device upon sensing of said fixed light intensity source and upon the sensing of the light intensity level of the character supporting medium surface, means responsive to the departure of said difference from a selected difference therebetween for producing a scanning device control voltage, means for applying said scanning device control voltage to said scanning device to vary the gain thereof in a direction to bring said detected difference into correspondence with said selected difference, means for establishing a threshold voltage level bearing a selected relation to the maximum output pulse amplitude produced from the darkest character portion sensed by said scanning device, means regulated by said threshold voltage level for producing discriminated pulses from said output pulses only when the output pulse amplitudes exceed said threshold voltage level, means for varying said threshold voltage level in accordance with variations in scanning device output pulse amplitudes resulting from character portion detection, said last mentioned means substantially instantaneously raising said threshold voltage level upon occurrence of output pulses of greater amplitude than the last threshold level establishing output pulse, means retarding response of said threshold establishing means to reducing said threshold voltage levels and means for maintaining said threshold voltage level above a preselected minimum value.

22. Apparatus for producing discriminated output pulses from a photoelectric scanning device of automatic character sensing apparatus sensing portions of dark characters and the like and producing positive scanning device output pulses whose amplitudes increase with increasing darkness, comprising means for shielding said scanning device from the scanning field periodically to produce a reference pulse of more positive voltage than the voltage output produced for any portion of the scanning field, means responsive to said reference pulse and the voltage output of said scanning device during scanning for producing a voltage pulse representative of the difference between the voltage levels of said reference pulse and the most negative voltage output from said scanning device resulting from scanning of character supporting document background reflectivity, means producing a control voltage to vary the gain of said scanning device, means regulating said control voltage producing means in accordance with the extent said difference varies from a preselected pulse amplitude to vary the gain of said scanning device in a direction to eliminate departure of said difference pulse from said preselected pulse amplitude, discriminator means for establishing a threshold voltage level bearing a selected relation to the voltage level of maximum amplitude output pulse produced by said scanning device upon sensing the darkest character portion in the scanning field during a selected number of scanning cycles, means regulated by said threshold voltage level for producing discriminated pulses from said output pulses only when their amplitudes exceed said threshold voltage level, means rendering said discriminator means substantially instantaneously responsive to greater output pulse amplitudes to elevate said threshold voltage level and retarding response of the same to smaller amplitude output pulses until such smaller pulses persist for a selected time period, and means for maintaining said threshold voltage level above a preselected minimum value.

23. The combination recited in claim 22 including means responsive to said discriminated pulses for producing substantially square pulses therefrom of corresponding time duration, means for amplifying said square pulses, and means for clipping the output signal of said amplifying means between preselected voltage levels.

24. Apparatus for producing discriminated output pulses from a photoelectric scanning device of automatic character sensing apparatus sensing portions of dark characters and the like and producing positive scanning device output pulses whose amplitudes increase with increasing darkness, comprising means for shielding said scanning device from the scanning field periodically to produce a reference pulse of more positive voltage than the voltage output produced for any portion of the scanning field, means responsive to said reference pulse and the voltage output of said scanning device during scanning for producing a voltage pulse representative of the difference between the voltage levels of said reference pulse and the most negative voltage output from said scanning device resulting from scanning of character supporting document background reflectivity, means producing a control voltage to vary the gain of said scanning device, means regulating said control voltage producing means in accordance with the extent said difference varies from a preselected pulse amplitude to vary the gain of said scanning device in a direction to eliminate departure of said different pulse from said preselected pulse amplitude, discriminator means for establishing a threshold voltage level bearing a selected relation to the voltage level of maximum amplitude output pulse produced by said scanning device upon sensing the darkest character portion in the scanning field, means regulated by said threshold voltage level for producing discriminated pulses from said output pulses only when their amplitudes exceed said threshold voltage level, means rendering said discriminator means substantially instantaneously responsive to greater output pulse amplitudes to elevate said threshold voltage level and retarding response of the same to smaller amplitude output pulses until the smaller pulses persist for a selected time period, means for clipping said periodic reference pulses to a preselected amplitude for producing minimum threshold pulses whose amplitudes are representative of scanning device output pulse amplitudes resulting from detection of character portions of selected minimum character darkness, means for entraining said minimum threshold pulses with said scanning device output pulses and applying the same to said discriminator means to establish the threshold voltage level by said minimum threshold pulses when the amplitudes of said scanning device output pulses are less than said minimum threshold pulse amplitudes for a selected time period, and means for blanking said minimum threshold pulses.

25. Apparatus for producing discriminated output pulses from a photoelectric scanning device of automatic character sensing apparatus sensing portions of dark characters and the like and producing positive scanning device output pulses whose amplitudes increase with increasing darkness, comprising means for shielding said scanning device from the scanning field periodically to produce a reference pulse of more positive voltage than the voltage output produced for any portion of the scanning field, means responsive to said reference pulse and the voltage output of said scanning device during scanning for producing a voltage pulse representative of the difference between the voltage levels of said reference pulse and the most negative voltage output from said scanning device resulting from scanning of character supporting document background reflectivity, means producing a control voltage to vary the gain of said scanning device, means regulating said control voltage producing means in accordance with the extent said difference varies from a preselected pulse amplitude to vary the gain of said scanning device in a direction to eliminate departure of said different pulse from said preselected pulse amplitude, discriminator means for establishing a threshold voltage level bearing a selected relation to the voltage level of maximum amplitude output pulse produced by said scanning device upon sensing the darkest character portion in the scanning field during a selected number of scanning cycles, means regulated by said threshold voltage level for producing discriminated pulses from said output pulses only when their amplitudes exceed said threshold voltage level, means rendering said discriminator means substantially instantaneously responsive to greater output pulse amplitudes to elevate said threshold voltage level and retarding response of the same to smaller amplitude output pulses until the smaller pulses persist for a selected time period, means for clipping said periodic reference pulses to a preselected amplitude for producing minimum threshold pulses whose amplitudes are representative of scanning device output pulse amplitudes resulting from detection of character portions of selected minimum character darkness, means for entraining said minimum threshold pulses with said scanning device output pulses and applying the same to said discriminator means to establish the threshold voltage level by said minimum threshold pulses when the amplitudes of said scanning device output pulses are less than said minimum threshold pulse amplitudes for a selected time period, and blanking means for suppressing said minimum threshold pulses at the output of said discriminated pulse producing means.

References Cited in the file of this patent

UNITED STATES PATENTS

| | | |
|---|---|---|
| 1,970,103 | Runaldue | Aug. 14, 1934 |
| 2,096,323 | Gille | Oct. 19, 1937 |
| 2,551,726 | Cooley | May 8, 1951 |
| 2,659,011 | Youmans et al. | Nov. 10, 1953 |
| 2,742,151 | Milford | Apr. 17, 1956 |
| 2,796,533 | Morton et al. | June 18, 1957 |